US011230964B2

(12) United States Patent
Tan et al.

(10) Patent No.: US 11,230,964 B2
(45) Date of Patent: Jan. 25, 2022

(54) MACHINE SYSTEM HAVING COOLER WITH PACK SEAL AND HEADER ASSEMBLY FOR SAME

(71) Applicant: Caterpillar Inc., Peoria, IL (US)

(72) Inventors: Dongming Tan, Dunlap, IL (US); James McCoy Voelker, Peoria, IL (US); Sharath Kumar Reddy Challa, Peoria, IL (US); Jianlong Xu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/852,893

(22) Filed: Apr. 20, 2020

(65) Prior Publication Data

US 2021/0324786 A1    Oct. 21, 2021

(51) Int. Cl.
*F02B 29/04* (2006.01)
*F28F 9/02* (2006.01)

(52) U.S. Cl.
CPC ...... *F02B 29/0425* (2013.01); *F02B 29/0418* (2013.01); *F28F 9/0248* (2013.01); *F02B 29/0475* (2013.01)

(58) Field of Classification Search
CPC .............. F02B 29/0425; F02B 29/0418; F02B 29/0475; F28F 9/0248; F28F 9/04; F28F 9/06
USPC ..................... 60/599; 123/563; 165/173, 178
See application file for complete search history.

(56) References Cited

U.S. PATENT DOCUMENTS

| | | | | |
|---|---|---|---|---|
| 1,198,307 | A * | 9/1916 | Zimmermann | F28F 9/0224 165/173 |
| 2,164,628 | A * | 7/1939 | Sibley | F28F 9/0226 165/173 |
| 2,627,241 | A * | 2/1953 | Przyborowski | B21D 53/08 165/173 |
| 2,969,956 | A * | 1/1961 | Forgo | F28F 9/06 165/178 |
| 3,027,142 | A * | 3/1962 | Albers | F28F 9/04 165/178 |
| 3,301,321 | A * | 1/1967 | Poore | F28F 9/0241 165/178 |
| 3,324,941 | A * | 6/1967 | Divers | F28F 9/06 165/173 |
| 3,467,180 | A * | 9/1969 | Pensotti | B21D 15/06 165/178 |

(Continued)

FOREIGN PATENT DOCUMENTS

CN    203463183 U    3/2014
CN    206513829 U    9/2017
(Continued)

*Primary Examiner* — Thai Ba Trieu
(74) *Attorney, Agent, or Firm* — Brannon Sowers & Cracraft

(57) ABSTRACT

A machine system includes a compressor, and a cooler having an inlet tank to receive compressed air from the compressor, and a header assembly attached to the inlet tank and including a plurality of cooling tubes supported in the header and each having an external heat exchange surface exposed to a flow of cooling air. The cooler further includes a plurality of graphite pack seals each extending peripherally around one of the cooling tubes, and a clamping assembly clamping the pack seals against the header to squeeze the pack seals into sealing contact with the cooling tubes and the header.

16 Claims, 4 Drawing Sheets

(56) References Cited

U.S. PATENT DOCUMENTS

| | | | | |
|---|---|---|---|---|
| 3,633,660 | A * | 1/1972 | Young | F28F 9/162 |
| | | | | 165/173 |
| 3,648,768 | A * | 3/1972 | Scholl | F28F 9/04 |
| | | | | 165/178 |
| 3,703,925 | A * | 11/1972 | Ireland | F28F 1/28 |
| | | | | 165/151 |
| 3,739,840 | A * | 6/1973 | Jones | F28F 9/165 |
| | | | | 165/178 |
| 3,993,126 | A * | 11/1976 | Taylor | F28F 9/162 |
| | | | | 165/173 |
| 4,722,387 | A * | 2/1988 | Aurand | F28F 9/18 |
| | | | | 165/173 |
| 5,152,144 | A * | 10/1992 | Andrie | F02B 29/0418 |
| | | | | 60/599 |
| 5,257,662 | A * | 11/1993 | Osborn | F28F 9/001 |
| | | | | 165/173 |
| 5,303,770 | A * | 4/1994 | Dierbeck | F28F 3/083 |
| | | | | 165/140 |
| 5,348,082 | A * | 9/1994 | Velluet | F28F 9/165 |
| | | | | 165/178 |
| 5,518,070 | A * | 5/1996 | Kato | F28D 1/05391 |
| | | | | 165/134.1 |
| 5,538,079 | A * | 7/1996 | Pawlick | F28F 9/06 |
| | | | | 165/173 |
| 5,787,973 | A * | 8/1998 | Kado | F28F 9/182 |
| | | | | 165/178 |
| 6,318,347 | B1 | 11/2001 | Dicke et al. | |
| 6,374,911 | B1 * | 4/2002 | Olson | F28F 9/0226 |
| | | | | 165/173 |
| 6,719,037 | B2 * | 4/2004 | Crook | F02B 29/0456 |
| | | | | 165/178 |
| 7,234,511 | B1 * | 6/2007 | Lesage | F28F 9/14 |
| | | | | 165/178 |
| 7,878,233 | B2 * | 2/2011 | Bates | F02B 29/0456 |
| | | | | 165/173 |
| 8,251,134 | B2 | 8/2012 | Janezich | |
| 8,876,119 | B2 | 11/2014 | Braun et al. | |
| 2003/0234009 | A1 * | 12/2003 | Kennedy | F02B 29/0418 |
| | | | | 123/568.12 |
| 2007/0227140 | A1 * | 10/2007 | Bates | F02B 29/0456 |
| | | | | 60/599 |
| 2008/0011456 | A1 * | 1/2008 | Meshenky | F28F 9/14 |
| | | | | 165/178 |
| 2010/0108304 | A1 * | 5/2010 | Nies | F28F 9/0229 |
| | | | | 165/173 |
| 2012/0247742 | A1 * | 10/2012 | Mizuno | F28F 9/0226 |
| | | | | 165/173 |
| 2015/0233652 | A1 * | 8/2015 | Yamamoto | F28F 9/04 |
| | | | | 165/173 |
| 2016/0238323 | A1 * | 8/2016 | Jones | F28F 3/025 |
| 2018/0224216 | A1 * | 8/2018 | Kennedy | F28F 9/06 |
| 2018/0224221 | A1 * | 8/2018 | Kennedy | F28F 9/06 |

FOREIGN PATENT DOCUMENTS

| | | | | |
|---|---|---|---|---|
| GB | 837213 A | * | 6/1960 | F28F 1/26 |
| GB | 1403737 A | * | 8/1975 | F28F 1/36 |
| JP | 04268199 A | * | 9/1992 | F28F 9/06 |
| JP | 2003119533 A | * | 4/2003 | F28F 21/084 |

* cited by examiner

MACHINE SYSTEM HAVING COOLER WITH PACK SEAL AND HEADER ASSEMBLY FOR SAME

TECHNICAL FIELD

The present disclosure relates generally to a cooler in a machine system, and more particularly to a cooler having a cooling tube supported in a header and a pack seal squeezed into sealing contact with the cooling tube and the header.

BACKGROUND

Many machine systems employ some form of active cooling of the equipment that utilizes air or dedicated coolant fluids. In the context of construction, mining, and agricultural machinery, for example, coolers are employed in well-known configurations for cooling engine oil, radiator fluid, transmission fluid, exhaust gases, and intake air. Intake air that is compressed in a turbocharger for feeding to an internal combustion engine, for example, can often be increased in temperature by several hundred degrees. While engines can be operated on hot pressurized intake air, in many instances it is desirable to cool pressurized intake air to increase its density.

A device known as an aftercooler, commonly air cooled, is arranged in an engine intake system fluidly between a compressor and an intake manifold in many designs. Aftercoolers, and cooling equipment generally, can be subjected to harsh conditions in many common machinery applications. For example, off-highway trucks and other equipment can operate upon rough terrain and subject cooling equipment such as aftercoolers to shocks, vibrations, and other mechanical stresses, with the equipment also experiencing extremes of temperature and wide temperature swings. As a result, aftercoolers and the like sometimes experience damage or performance degradation prior to the end of an intended service life. One example aftercooler used in a machinery application is set forth in U.S. Pat. No. 6,318,347 to Dicke et al.

SUMMARY OF THE INVENTION

In one aspect, a machine system includes a compressor having an air inlet, and a compressed air outlet. The machine system further includes a cooler having an inlet tank, a header attached to the inlet tank, and having an inlet header side and a second header side opposite to the inlet header side, and a cooling tube. The cooling tube includes an inlet tube end supported in the header and opening to the inlet tank and an outlet tube end arranged to feed cooled air to a machine in the machine system, and the cooling tube having at least one external heat exchange surface exposed to a flow of cooling air between the inlet tube end and the outlet tube end. The cooler further includes a pack seal extending peripherally around the cooling tube, and a clamping assembly coupled to the second header side and clamping the pack seal against the header, such that the pack seal is squeezed into sealing contact with each of the cooling tube and the header.

In another aspect, an air-to-air aftercooler (ATAAC) for an intake system in an internal combustion engine includes an inlet tank having a compressed air inlet, and an outlet tank having a cooled air outlet. The ATAAC further includes a header attached to the inlet tank and having an inlet header side, and a second header side opposite to the inlet header side, and a cooling tube having an inlet tube end supported in the header and opening to the inlet tank and an outlet tube end opening to the outlet tank. The cooling tube includes at least one heat exchange surface exposed to a flow of cooling air between the inlet tube end and the outlet tube end. The ATAAC further includes a pack seal extending peripherally around the cooling tube, and a clamping assembly coupled to the second header side and clamping the pack seal against the header, such that the pack seal is squeezed into sealing contact with each of the cooling tube and the header.

In still another aspect, a header assembly for an air-to-air aftercooler (ATAAC) includes a header having an inlet header side structured for coupling with an inlet tank, and a second header side opposite to the inlet header side, a plurality of tube openings extending between the inlet header side and the second header side, and a plurality of seal cavities in communication with the plurality of tube openings. The header assembly further includes a plurality of cooling tubes supported in the header within the plurality of tube openings, a plurality of pack seals positioned within the plurality of seal cavities, and a clamping assembly coupled to the second header side and clamping the plurality of pack seals against the header, such that the plurality of pack seals are squeezed into sealing contact with the plurality of cooling tubes and the header.

DETAILED DESCRIPTION

Figure 1:
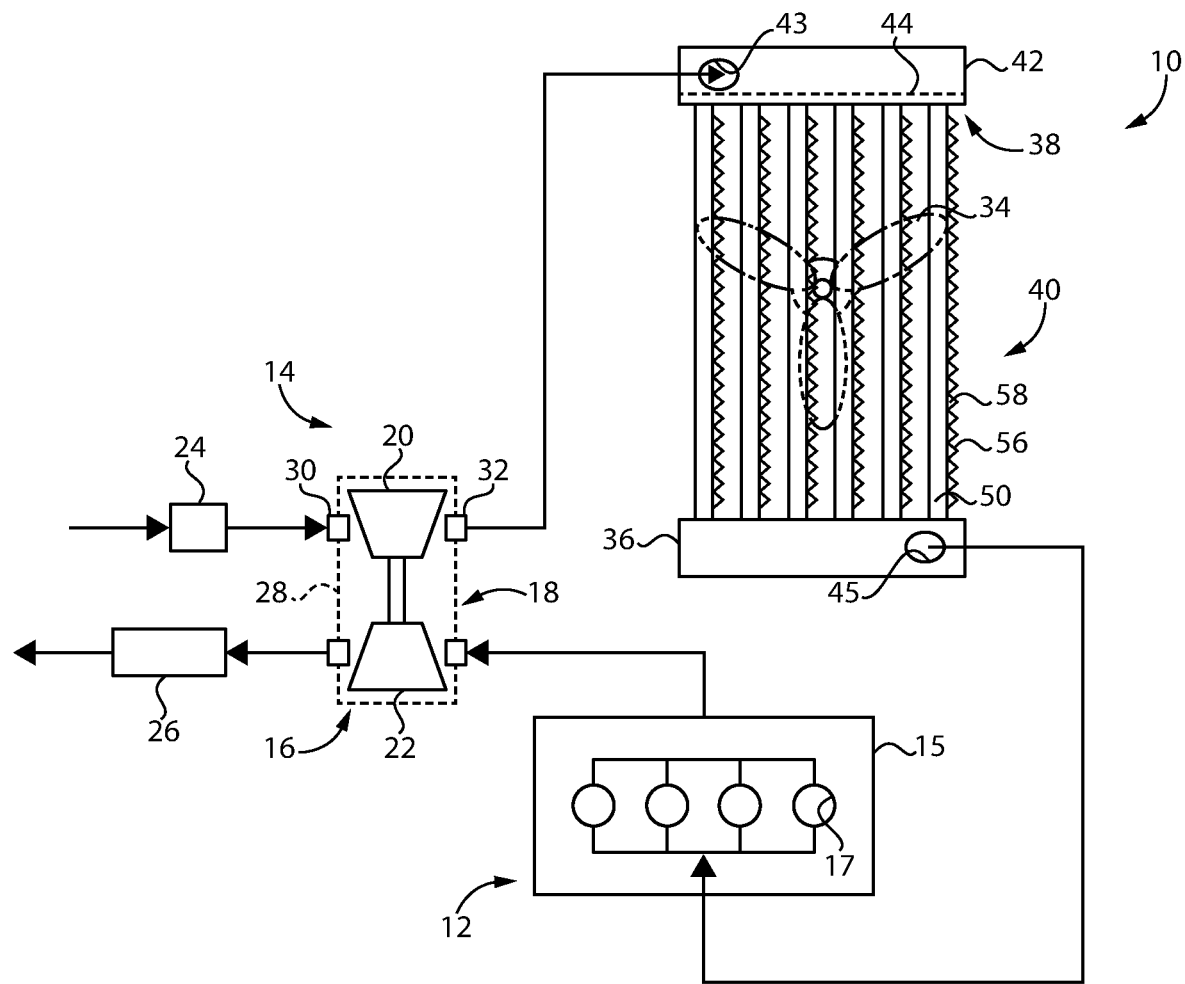
FIG. 1 is diagrammatic view of a machine system, according to one embodiment.

Referring to FIG. 1, there is shown a machine system 10 according to one embodiment and including a machine 12 having a machine housing 15, an intake system 14 for machine 12, and an exhaust system 16. Machine 12 may be an internal combustion engine where machine housing 15 includes an engine housing or cylinder block, having a plurality of combustion cylinders 17 formed therein. In one such engine implementation, machine 12 includes a direct-injected compression-ignition diesel engine structured to operate on a diesel distillate fuel, for example. Intake system 14 may thus include an engine air intake system, with exhaust system 16 including an engine exhaust system. Intake system 14 can deliver air, or mixtures of air, exhaust, and potentially a gaseous fuel such as natural gas, to cylinders 17 for combustion in a generally known manner. Intake system 14 includes an air filter 24, a compressor 20, a cooler 40, and potentially other apparatus for pressurizing, cooling, and conveying air to be delivered to machine 12. Exhaust system 16 may include a turbine 22 and one or more aftertreatment devices 26 in a generally known configuration and for generally known purposes. Compressor 20 and turbine 22 may be parts of a turbocharger coupled with machine 12 and operated in a generally conventional manner. In some implementations, multiple turbocharger stages could be used. It is contemplated that machine system 10 can be a mobile vehicular application such as an off-highway mining truck or the like, however, the present disclosure is not thereby limited and machine system 10 could be an engine-generator set, a pump, a compressor, or still another stationary machine. As will be further apparent from the following description, cooler 40 is structured for improved resistance to thermal stress, shocks, vibrations or the like, without sacrificing performance.

Compressor 20 and turbine 22 may be supported for rotation in a turbocharger housing 28 having an air inlet 30, and a compressed air outlet 32. Air compressed by operation of compressor 20 can be fed to cooler 40 and into a compressed air inlet 43 formed in, or fluidly connected to, an inlet tank 42 of cooler 40. Cooler 40 may also include or be coupled to an outlet tank 36 having a cooled air outlet 45, structured to feed air that has been compressed, cooled and thereby increased in density, to machine 12 for combustion with fuel in cylinders 17. Cooler 40 also includes a header 44 in a header assembly 38 further discussed herein, and a cooling tube 50 for conveying air between inlet tank 42 and outlet tank 36, and having at least one external heat exchange surface 56 exposed to a flow of cooling air. In the illustrated embodiment cooling tube 50 is one of a plurality of interchangeable cooling tubes, with external heat exchange surface 56 being formed on a fin 58 attached to each cooling tube 50. It should be appreciated that discussion of any component herein in the singular, such as cooling tube 50, should be understood by way of analogy to refer to any similar or identical components optionally or obligately used. A cooling fan 34 is provided to produce a flow of cooling air that blows across and among cooling tubes 50 to exchange heat with compressed air conveyed through cooling tubes 50. It will thus be appreciated that cooler 40 may be an air-to-air aftercooler or ATAAC, however, the present disclosure is not strictly limited as such.

Figure 2:
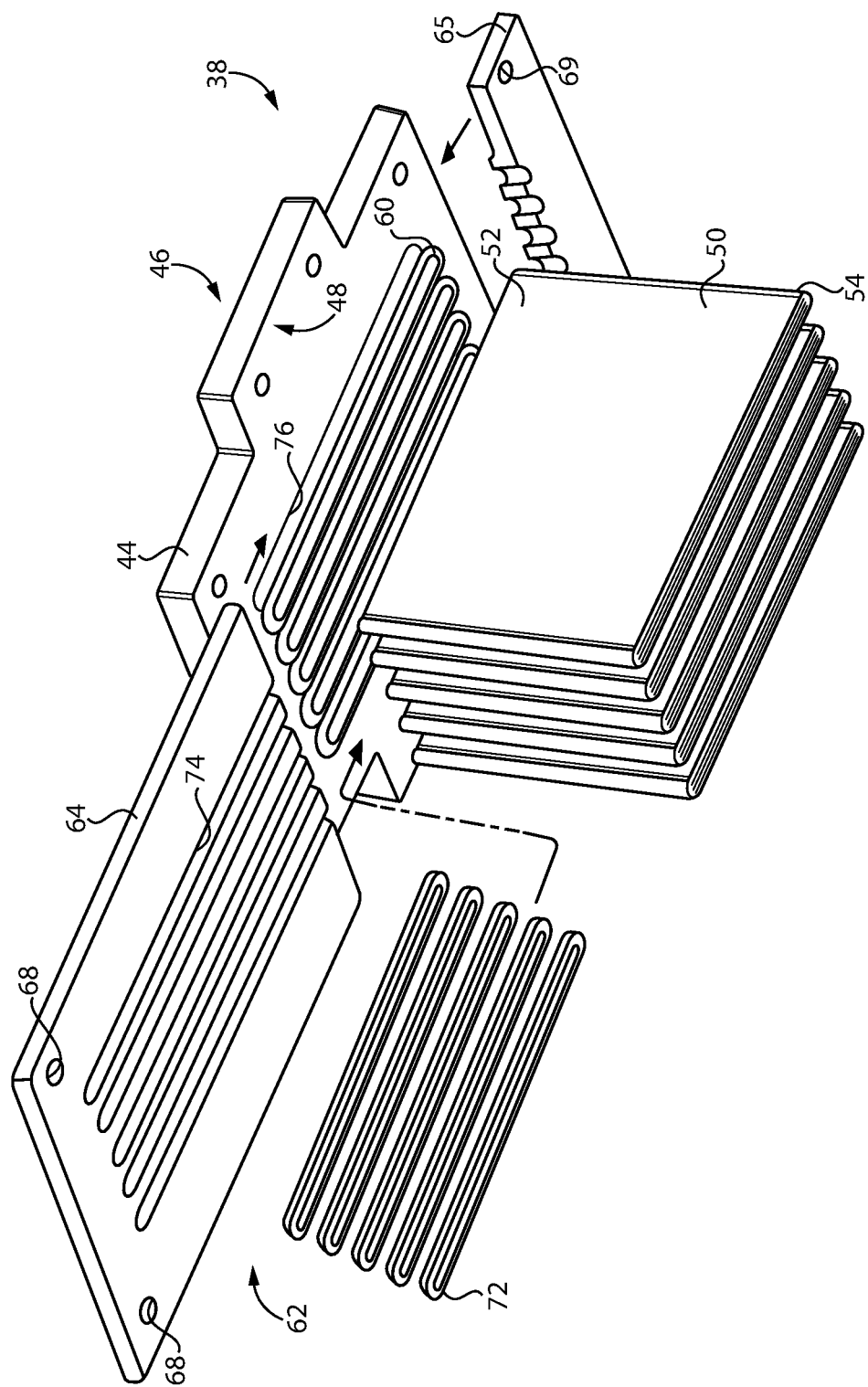
FIG. 2 is a disassembled view of a header assembly, according to one embodiment.
Figure 3:
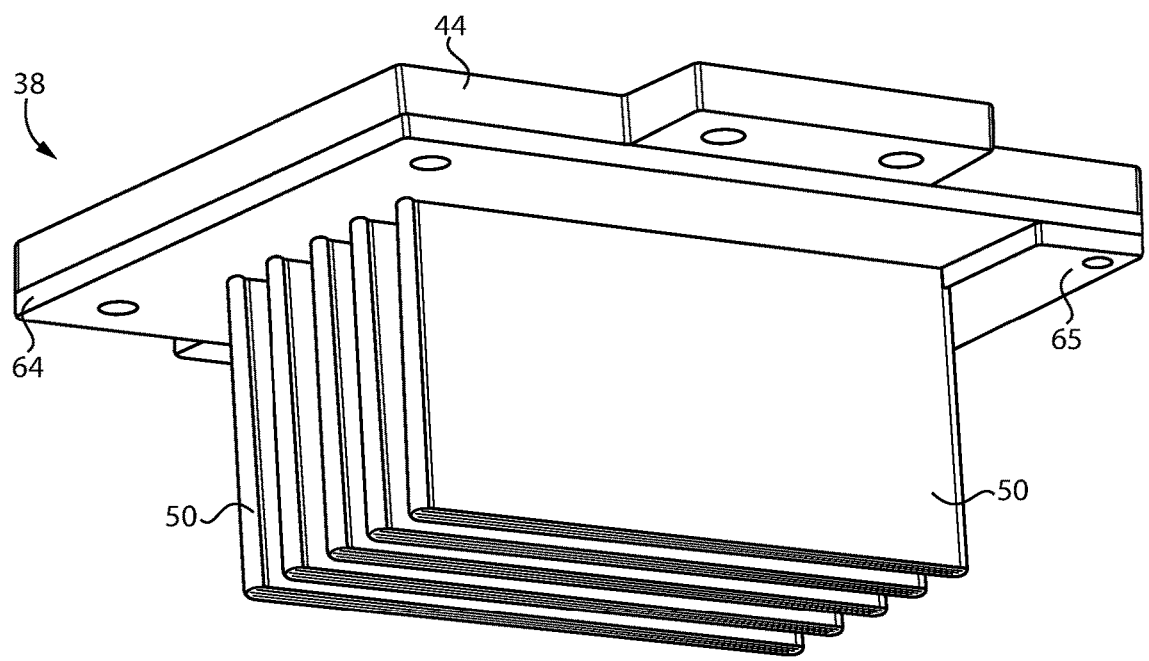
FIG. 3 is an assembled view of a header assembly, according to one embodiment.

Referring now also to FIGS. 2 and 3, there are shown features of header assembly 38 in further detail. It will be recalled cooler 40 includes an inlet tank 42. Header 44 may be attached to inlet tank 42, such as by welding, brazing or bolting, or combinations thereof, and includes an inlet header side 46 and a second header side 48 opposite to inlet header side 46. Inlet header side 46 may form a wall of inlet tank 42 in some embodiments. Cooling tube 50, and as in the illustrated case a plurality of cooling tubes 50, includes an inlet tube end 52 supported in header 44 and opening to inlet tank 42. Cooling tube 50 also includes an outlet tube end 54 arranged to feed cooled air to machine 12 in machine system 10, such as by feeding cooled air into outlet tank 36.

It has been observed that certain prior cooler designs can experience cracking or other problems with cooling tubes, headers, or related apparatus. As further discussed herein the manner of supporting cooling tube 50 in header 44 and providing for fluid sealing is expected to provide improved resistance to cracking or other problems with the apparatus. To this end, cooler 40 further includes a flexible pack seal 60, and in the illustrated case a plurality of interchangeable pack seals 60, each extending peripherally around one of cooling tubes 50. Cooler 40 also includes a clamping assembly 62 coupled to second header side 48 and clamping the plurality of pack seals 60 against header 44, such that each pack seal 60 is squeezed into sealing contact with each of the respective cooling tube 50 and header 44. In one practical implementation, each pack seal 60 is formed of flexible graphite packing material, such as a filamentous graphite material in the form of a braid, a rope, a weave, or other construction.

Clamping assembly 62 may also include a clamping plate 64 that is clamped to header 44 to clamp each pack seal 60 against header 44. Clamping assembly 62 also includes clamping bolts, discussed below, received in bolt holes 68 formed in clamping plate 64. Also in the illustrated embodiment, clamping assembly 62 includes a second clamping plate 65, which in cooperation with clamping plate 64 is used to position and clamp pack seals 60. Additional bolt holes 69 are formed in second clamping plate 65. It should be appreciated that a single clamping plate, two clamping plates, or a number of clamping plates greater than two such as a clamping plate number equal to a number of cooling tubes 50 might be employed in other embodiments.

Figure 4:
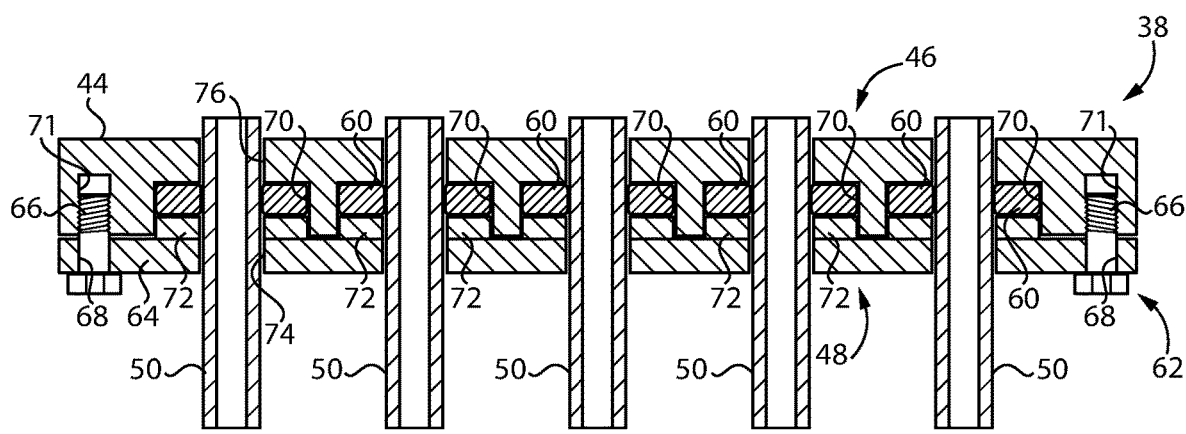
FIG. 4 is a sectioned view through a header assembly, according to one embodiment.

As also shown in FIG. 2, a plurality of tube openings 76 are formed in header 44, and extend between inlet header side 46 and second header side 48. Cooler 40 may further include a plurality of interchangeable seal retainers 72, each sandwiched between clamping plate 64 and a corresponding one of pack seals 60. Seal retainers 72 can have the form of elongate sealing rings, each extending peripherally around one of cooling tubes 50. Seal retainers 72 may be oval-shaped in some embodiments, as illustrated. When clamped in position for service, pack seals 60 may be shaped similarly to seal retainers 72. Referring also now to FIG. 4, there is shown a sectioned view through header assembly 38 and illustrating clamping bolts 66 passed through bolt holes 68 in clamping plate 64, and received in bolt holes 71 formed in header 44. In the illustrated embodiment, bolt holes 71 are threaded to receive clamping bolts 66. As noted above, tube openings 76 extend through header 44, A plurality of tube openings 74 formed in clamping plate 64 are in register with tube openings 76. It can also be seen from FIG. 4 that a plurality of seal cavities 70 are formed in header 44 and pack seals 60 are positioned one within each seal cavity 70. Seal retainers 72 are shown sandwiched between clamping plate 64 and pack seals 60. As noted above, header assembly 38 may be structured for resistance to cracking and other damage or degradation, based upon the manner by which cooling tubes 50 are supported and sealed in header assembly 38. It has been discovered that providing cooling tubes 50 with some capacity for thermal growth, and/or bending in response to temperature changes, shocks or vibrational loads, relative to other hardware in cooler 40, can assist in providing such resistance to cracking. The temperature of compressed air fed into cooling tubes 50 may be in excess of 200° C., hotter than many seal types such as rubber or other polymeric seals are capable of withstanding. During service, such as in an off-highway machine, cooler 40 can experience vibrations, bumps, et cetera, with the result being that the service environment for cooler 40 and in particular header assembly 38 can be quite harsh.

Figure 5:
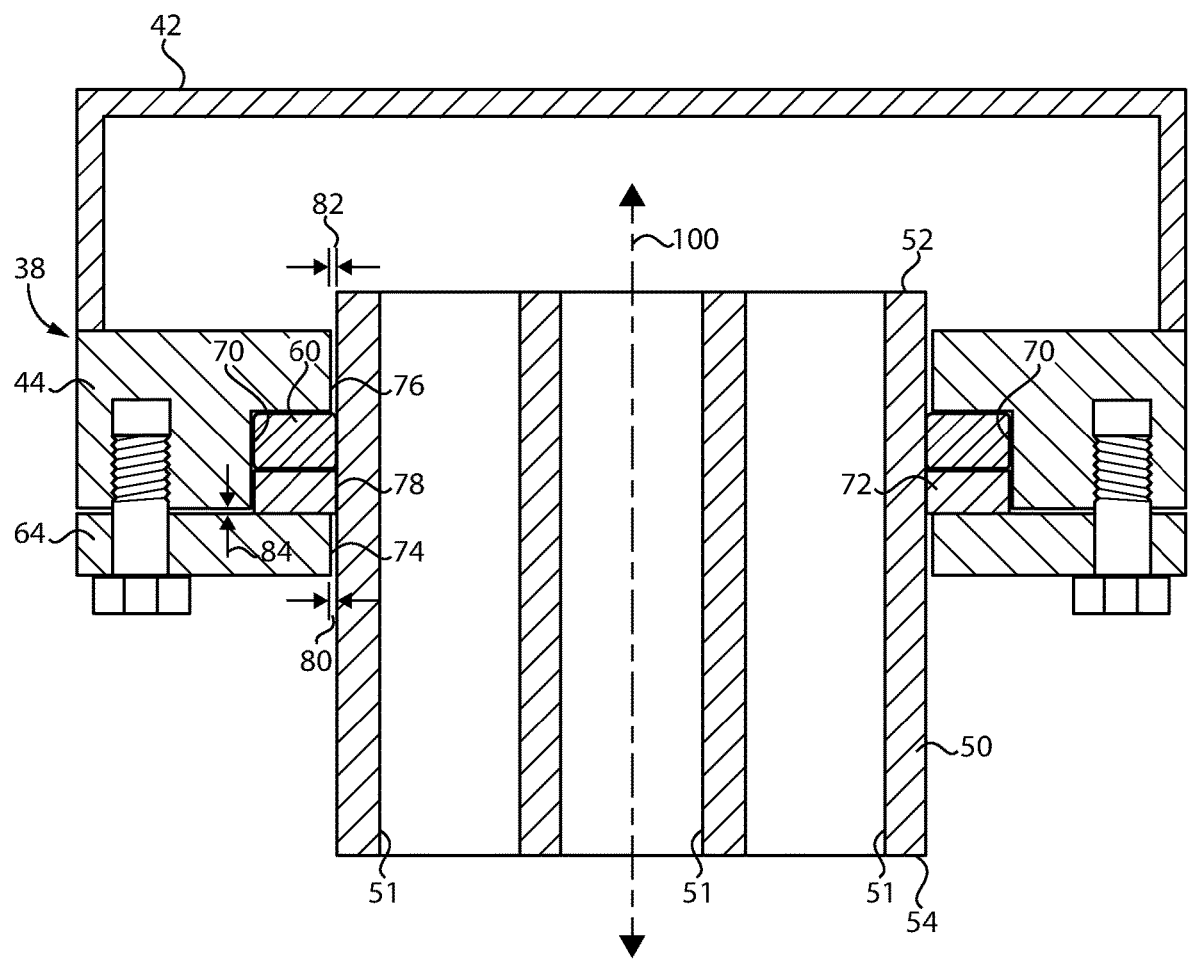
FIG. 5 is another sectioned view through a header assembly, according to one embodiment.

Referring also now to FIG. 5, a first clearance 78 extends between cooling tube 50 and seal retainer 72. First clearance 78 may be a relatively tight clearance, for example a slip-fit or pilot-fit clearance. A second clearance 80 extends between cooling tube 50 and clamping plate 64 and is larger than first clearance 78. A third clearance 82 extends between cooling tube 50 and header 44. Clearances 80 and 82 may each fully surround the respective cooling tube 50. Clearances 80 and 82 may be from 4 millimeters to 12 millimeters. In a refinement, clearance 80 and 82 may be approximately 8 millimeters, and still more particularly approximately 7.9 millimeters, within measurement error. It will be appreciated that as cooling tube 50 expands and shrinks in response to temperature changes, and experiences vibrations, bending loads or twisting loads, the clearances or gaps 80 and 82 can prevent interference between the respective parts that can lead to material stress, fatigue failure, deformation, cracking, or other problems. It can also be noted yet another clearance 84 extends between clamping plate 64 and header

44. As bolts 66 are rotated into engagement with header 44, seal retainer 72 can be clamped down against pack seal 70 to a specified clamping load, squeezing pack seal 60 radially inward, radially outward, and axially between header 44 and seal retainer 72. Providing clearance 84 can enable a controlled clamping load to be applied without bottoming out based on contact between clamping plate 64 and header 44. Still other features of header assembly 38 are shown in FIG. 5, and it can be noted that cooling tube 50 defines a longitudinal axis 100 extending between inlet tube end 52 and outlet tube end 54, and forms a plurality of flow passages 51, in a single row in cooling tube 50 and arranged side-by-side. Cooling tube 50 can include a one-piece extrusion, for example, formed of aluminum. In other embodiments, a greater number of flow passages, or only one or two flow passages might be employed. Moreover, a header assembly as contemplated herein could include only one cooling tube, with or without attached heat dissipation fins, or a greater number of cooling tubes than illustrated in the attached drawings, such as eight, ten, twenty or still more.

INDUSTRIAL APPLICABILITY

When machine system 10 is operated in service, turbocharger 18 is rotated based upon an exhaust output of machine 12 to rotate compressor 20, and feed compressed air increased in temperature into inlet tank 42. The temperature of compressed air supplied to inlet tank 42 can be increased from an ambient temperature by hundreds of degrees C., for example up to at least 250° C. The hot compressed air is then fed through cooling tubes 50 to exchange heat with a flow of cooling air produced by fan 34. The compressed air that is cooled is fed to outlet tank 36 and then to cylinders 17 for combustion.

As discussed above the thermal stress and other conditions experienced by certain components of cooler 40, including header assembly 38 during service, can be severe. The relatively high temperatures, temperature changes, expansion and contraction of materials, shocks, loads, vibrations, et cetera, render the requirements for supporting cooling tubes 50 in header 44 quite stringent, if cracking or other problems are to be avoided. It will be recalled that pack seals 60 provide for fluid sealing between header 44 and cooling tubes 50 to avoid leakage of compressed air, while still allowing cooling tubes 50 to expand, contract, twist, bend, etc., by way of clearances between cooling tubes 50 and clamping plate 64 and header 44. Even during such conditions, pack seals 60 can flex to maintain the fluid sealing of the joints between header 44 and cooling tubes 50. It should also be appreciated that the disclosed range for the size of clearance 80 enables the desired flexibility of the joint supporting cooling tube 50 while also providing a desired clamping load and clamping pattern upon each pack seal 60. In other words, the size of clearance 80 can be understood to balance providing a suitable clamping load in a suitable clamping direction upon pack seal 60, while also accommodating the desired flexibility in the joint formed between cooling tube 50 and header 44.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed:

1. A machine system comprising:
   a compressor having an air inlet, and a compressed air outlet;
   a cooler including an inlet tank, a header attached to the inlet tank and having an inlet header side and a second header side opposite to the inlet header side, and a cooling tube;
   the cooling tube including an inlet tube end supported in the header and opening to the inlet tank and an outlet tube end arranged to feed cooled air to a machine in the machine system, and the cooling tube having at least one external heat exchange surface exposed to a flow of cooling air between the inlet tube end and the outlet tube end; and
   the cooler further including a pack seal extending peripherally around the cooling tube, and a clamping assembly coupled to the second header side and clamping the pack seal against the header, such that the pack seal is squeezed into sealing contact with each of the cooling tube and the header;
   the clamping assembly including a clamping plate and a plurality of clamping bolts received in the header;
   a seal cavity is formed in the header, and the pack seal is positioned within the seal cavity; and
   a seal retainer sandwiched between the clamping plate and the pack seal.

2. The machine system of claim 1 wherein the pack seal is formed of flexible graphite packing material.

3. The machine system of claim 1 wherein a first clearance extends between the cooling tube and the seal retainer, and a second clearance larger than the first clearance extends between the cooling tube and the clamping plate.

4. The machine system of claim 3 wherein the second clearance is from 4 mm to 12 mm.

5. The machine system of claim 1 wherein:
   a plurality of flow passages are formed in the cooling tube;
   the cooling tube includes a one-piece extrusion forming the plurality of flow passages; and
   the at least one external heat exchange surface is a heat exchange surface of a fin attached to the one-piece extrusion.

6. The machine system of claim 5 wherein the cooling tube is one of a plurality of interchangeable cooling tubes supported in the header, and the pack seal is one of a plurality of interchangeable pack seals for the plurality of interchangeable cooling tubes, and wherein the cooler further includes a fan structured to produce the flow of cooling air to exchange heat with compressed air conveyed through the plurality of interchangeable cooling tubes.

7. An air-to-air aftercooler (ATAAC) for an intake system in an internal combustion engine comprising:
   an inlet tank having a compressed air inlet;
   an outlet tank having a cooled air outlet;
   a header attached to the inlet tank and having an inlet header side, and a second header side opposite to the inlet header side;

a cooling tube including an inlet tube end supported in the header and opening to the inlet tank and an outlet tube end opening to the outlet tank;

the cooling tube includes at least one heat exchange surface exposed to a flow of cooling air between the inlet tube end and the outlet tube end;

a pack seal extending peripherally around the cooling tube; and a clamping assembly coupled to the second header side and clamping the pack seal against the header, such that the pack seal is squeezed into sealing contact with each of the cooling tube and the header, and the clamping assembly including a clamping plate, and a seal retainer sandwiched between the clamping plate and the pack seal.

8. The ATAAC of claim 7 wherein a seal cavity is formed in the header and the pack seal and the seal retainer are each positioned within the seal cavity.

9. The ATAAC of claim 8 wherein the clamping assembly includes a clamping plate and a plurality of clamping bolts received in the header.

10. The ATAAC of claim 9 wherein the clearance between the cooling tube and the clamping plate is approximately 8 mm.

11. The ATAAC of claim 7 wherein clearances are formed between the cooling tube and the clamping plate and between the cooling tube and the header, and are from 4 mm to 12 mm.

12. The ATAAC of claim 7 wherein:

a plurality of flow passages are formed by the cooling tube;

the cooling tube is one of a plurality of interchangeable cooling tubes each including a one-piece extrusion and a cooling fin attached to the one-piece extrusion; and the ATAAC further includes a fan structured to blow cooling air across the cooling fins.

13. A header assembly for an air-to-air aftercooler (ATAAC) comprising:

a header having an inlet header side structured for coupling with an inlet tank, and a second header side opposite to the inlet header side, a plurality of tube openings extending between the inlet header side and the second header side, and a plurality of seal cavities formed in the second header side and each in communication with one of the plurality of tube openings;

a plurality of cooling tubes supported in the header within the plurality of tube openings and each defining a longitudinal axis;

a plurality of pack seals positioned within the plurality of seal cavities; and a clamping assembly coupled to the second header side and clamping the plurality of pack seals against the header, such that the plurality of pack seals are each squeezed, within a respective one of the plurality of seal cavities, into radially inward sealing contact with one of the plurality of cooling tubes and radially outward sealing contact with the header.

14. The header assembly of claim 13 wherein the clamping assembly includes a clamping plate having another plurality of tube openings formed therein and receiving the plurality of cooling tubes, and a plurality of seal retainers sandwiched between the clamping plate and the plurality of pack seals.

15. The header assembly of claim 14 wherein the clamping assembly further includes clamping bolts received in the header.

16. The header assembly of claim 14 wherein smaller clearances are formed between the plurality of seal retainers and the plurality of cooling tubes, and larger clearances are formed between the header and the plurality of cooling tubes and between the clamping plate and the plurality of cooling tubes.

* * * * *